(12) United States Patent
Smith

(10) Patent No.: US 7,281,666 B2
(45) Date of Patent: Oct. 16, 2007

(54) AUTOMOBILE IDENTIFICATION DEVICE

(76) Inventor: Joseph C Smith, 3163 Belvedere Ave., Highland, CA (US) 92346

( * ) Notice: Subject to any disclaimer, the term of this patent is extended or adjusted under 35 U.S.C. 154(b) by 82 days.

(21) Appl. No.: 10/906,760

(22) Filed: Mar. 4, 2005

(65) Prior Publication Data

US 2005/0194435 A1    Sep. 8, 2005

Related U.S. Application Data

(60) Provisional application No. 60/521,188, filed on Mar. 5, 2004.

(51) Int. Cl.
*G06K 7/08* (2006.01)
(52) U.S. Cl. .................... 235/492; 235/487
(58) Field of Classification Search ........... 235/462.01, 235/449, 385, 493, 492, 487
See application file for complete search history.

(56) References Cited

U.S. PATENT DOCUMENTS

| | | | |
|---|---|---|---|
| 5,503,434 A * | 4/1996 | Gunn | 283/67 |
| 2005/0139664 A1* | 6/2005 | Yamagiwa | 235/385 |
| 2006/0107560 A1* | 5/2006 | Wong | 40/124.01 |

* cited by examiner

*Primary Examiner*—Daniel Stcyr
(74) *Attorney, Agent, or Firm*—Michael L. Greenberg, Esq.; Greenberg & Lieberman, LLC

(57) ABSTRACT

A vehicle identification system is disclosed that organizes pertinent data about an automobile and the automobile's owner on a card the size of a credit card. Various pictures of the vehicle are positioned on the card for quick visual inspection, and a bar code and magnetic strip interface with established national networks so that registration information can be gained instantaneously. Detailing performed on the vehicle can also be stored on the card via the bar code and/or magnetic strip to assist insurance and law enforcement employees in confirming a vehicle.

19 Claims, 2 Drawing Sheets

AUTOMOBILE IDENTIFICATION DEVICE

FIELD OF THE INVENTION

The present invention is an identification system for an automobile. Specifically, the present invention is an identification card for the automobile that contains and displays detailed information about a vehicle to assist law enforcement officers if the vehicle is stolen, pulled over for a traffic stop, or damaged.

BACKGROUND OF THE INVENTION

Automobile theft is a growing problem in the United States, as well as around the world. Typically, a vehicle can be equipped with all theft deterrent systems, and still it can be stolen, disassembled, and sold before being recovered. Worse still, once a vehicle has been stolen, it is often used in commission of a more serious crime. Without question, there is a need to prevent automobile theft in some other way than trying to simply improve locks and engine arrest systems.

Tracking systems are some of the most effective ways to recover an automobile that has been stolen. For example, the LoJack™ system tracks the position of a vehicle once the owner has alerted law enforcement officials that the vehicle has been stolen. Typically, because the LoJack™ device is hidden unobtrusively in an automobile, the auto thief does not have time to try to locate the device before the position of the vehicle is determined. Accordingly, LoJack™ seems to be rather effective at vehicle recovery. However, not all owners realize that their vehicle has been stolen until hours after the automobile is gone. In such case, the LoJack™ device might not be an effective answer because the vehicle could easily have been stripped down already, or worse, used in the commission of another crime. Quite simply, there is a need for a different approach to automobile theft prevention.

In addition, when law enforcement officers pull over a vehicle in a routine traffic stop, the standard routine is to request the operator's driver's license and the vehicle's registration. There is an inherent danger to the law enforcement officer when the operator typically leans over to the glove compartment to retrieve the registration information. It is desirable that the vehicle's operator would only have to provide one piece of identification to the officer, and that identification would suffice for both the operator and the vehicle.

Also, when vehicles are stolen, oftentimes the only information known to the insurer is the make and model of the vehicle, but add-ons are not recorded anywhere; thus, the owner of an unrecovered vehicle is not properly compensated for loss. It is desirable to have a method of officially and easily recording modifications to vehicles for insurance record purposes in case of theft, or even damage.

EP 0072336B1, GB 2352678A, and JP 03009585 are selections from a plethora of identification systems for automobiles which provide information linked to the automobile. However, unlike the present invention, the relevant art does not provide information in an instantaneous and organized fashion to quickly assist law enforcement officers in recovering and/or ultimately identifying an automobile. Unlike the present invention, there is not the kind of information detailing the vehicle to properly allow insurance companies to recognize the severity of a loss or damage.

Therefore, a need for a portable and simple automobile identification system exists despite attempts in the relevant art.

SUMMARY OF THE INVENTION

The present invention is an automobile identification card that provides information for law enforcement officers. The present invention has a vehicle's make, model, color, wheels, and other pertinent information that helps in a visual identification in case the vehicle has been stolen.

Containing very specific information about the automobile regarding add-ons such as special wheels, tinted windows, detailing, and damage, the present invention becomes a permanent record of a vehicle that can be used with insurance companies in properly compensating an automobile's owner in the event that the automobile is stolen.

Moreover, the present invention is a quick identification system for law enforcement officers if an automobile is pulled over on the side of a road. The present invention provides a quick and simple way to gain a large amount of information about a vehicle and its driver, rather than having to simply rely on a driver's license retrieved from the driver's wallet and registration information retrieved from a glove box. Programmed on the back of the present invention is registration information for a vehicle, as well as other supplementary information to aid in acknowledging a driver and vehicle.

DETAILED DESCRIPTION OF THE PREFERRED EMBODIMENT(S)

Figure 1:
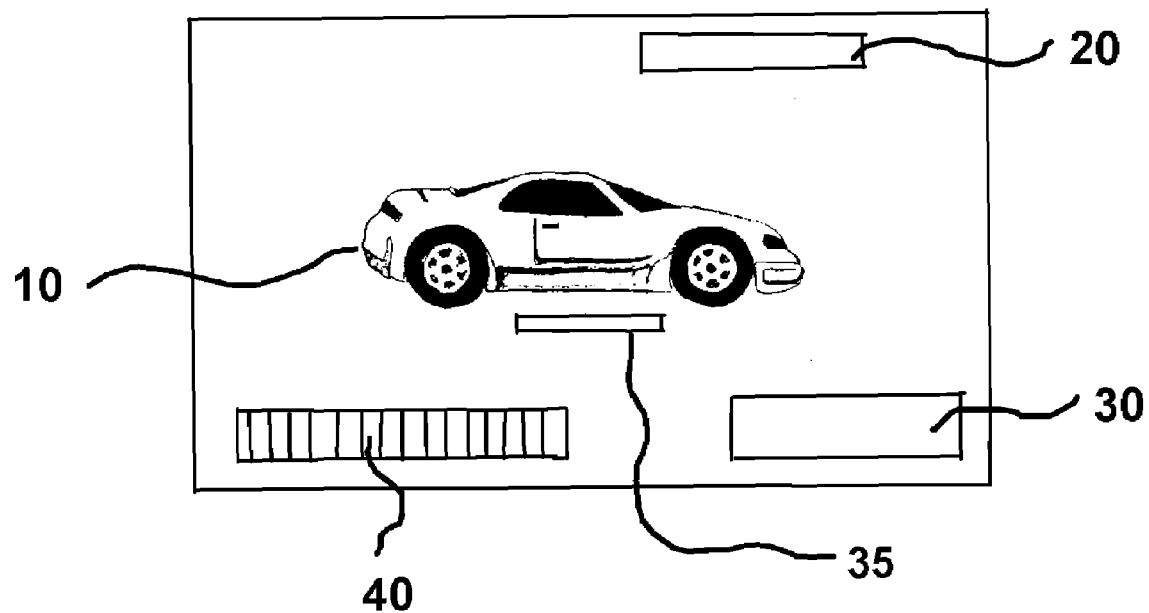
FIG. 1 shows the front side of a first embodiment of the present invention.

In the preferred embodiment of the present invention, the present invention is the size of a conventional credit card, and it has a picture of an automobile's first side (10) on its front face (FIG. 1). The picture of the automobile's first side (10) should be large enough for a viewer to observe several aspects about the vehicle, including but not limited to the vehicle's made, model color, shape, design, shade of window tint, type of wheels or rims, or any identifying marks. Superimposed on the picture is the vehicle's license plate number (20). A bar code (40) is also disposed on the front of the present invention, and the bar code (40) is linked to a data file maintained in law enforcement computers. Furthermore, the front face will contain a field in which the company name (30) will be disposed. The front face will also contain an empty field (35), in which the user or the authorized card manufacturer will be able to add personalized material. For example, a religious individual may be able to site a scripture.

Figure 2:
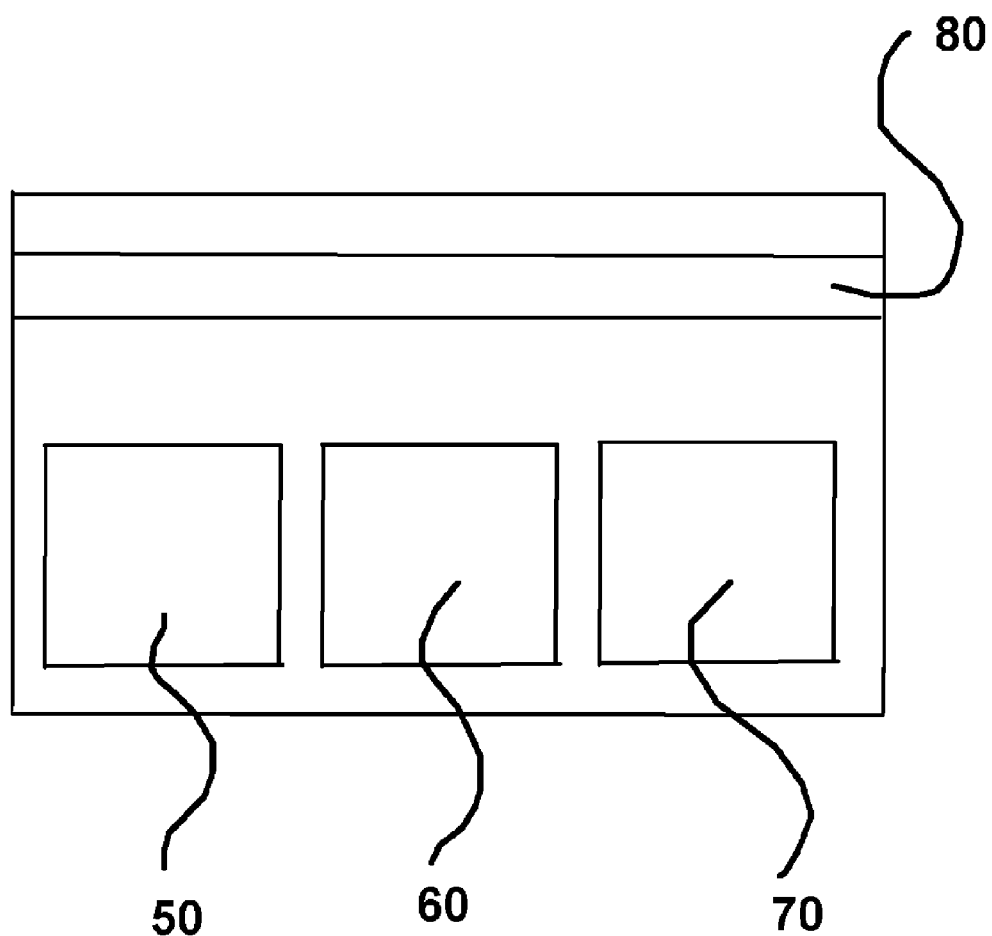
FIG. 2 shows the back side of a first embodiment of the present invention.

On the rear face of the preferred embodiment of the present invention is a magnetic strip (80) containing information regarding the vehicle and the owner—the equivalent of registration information. Below the magnetic strip are photos of the front (50), rear (60), and second side (70) of the automobile. While FIGS. 1 and 2 show a particular order in which these pictures are shown, the items on the card can be rearranged in furtherance of the principals of the present invention, and are not limited to the layout set forth in this embodiment.

Most importantly, the present invention has a magnetic strip (80) and/or bar code (40) that contains information compatible with the nationwide motor vehicles and law enforcement data system—to ensure that information is readily readable when time is of the essence or during a traffic stop. Because the bar code (40) and magnetic strip (80) will essentially be used by law enforcement and security agents, they will contain similar information, possibly including but not limited to the owner's name, social security number, birth date, vehicle registration information, and even possibly the driver's insurance information. Furthermore, while the photo of the vehicle's first side (10) gives the viewer a complete description of the car, including but not limited to the vehicle's make, model, color, shape, design, shade of window tint, type of wheels or rims, identifying marks, etc., this information may still be encoded in the magnetic strip (80) and/or bar code (40). Further embodiments have been conceived in which the information is rearranged such that the vehicle identifying information is printed on the card. The bar code (40) will further include a secret code, which is in essence the automobile manufactory code not given on the vehicle's registration. This information will benefit the Military and the State Border Patrol.

The present invention requires a camera, a scanner, a scan disk, a computer, a printer, an encoder, a card, a bar coder, and a reader. Any camera or photographic device furthering the principles of this invention suffices for capturing images. The camera is important to take a complete photo of a vehicle for identification so that the make, model, color, wheels, window tint, shape, special marks, etc. of a vehicle are readily apparent. Furthermore, the camera can be used to take a photograph of the vehicle owner, in order to add that to the card as well. The scanner is needed to take a photo and move it to a computer for processing. If a digital camera is used to capture the picture, the scanner will not be necessary, and the user can proceed to the next step. The scan disk is a computer device used to transfer a digital photo onto a save disk and then transfer it to computer software when the save disk is placed in the computer.

The computer is then used to manipulate the image before printing the final product. The printer is a conventional electronic device used to print a photo or object to the special card printer. The encoder is a special electronic device used to encode or write all information pertaining to a vehicle to a magnetic strip (80) and bar code (40). The reader is also used to read the information that has been encoded onto the magnetic strip (80) and bar code (40).

To make the present invention, the camera employed to take a photo of a vehicle. If email is employed, a photo of the vehicle can be simply downloaded from an email message to a computer. A laptop can also be employed to provide the image via scan disk. The image is then scanned or imported into software for modifying. The vehicle's registration information is then encoded onto a magnetic strip (80) and bar code (40) for final processing. Currently, the magnetic strip (80) of the card can hold 3 tracks of information (much like most driver's licenses and credit cards today), however can hold more tracks of information as technology advances. Furthermore, the bar code (40) can hold 1 track of information, however can hold more tracks of information as technology advances.

The information that is encoded on the card can be obtained in several ways. Currently, the process is much like that of obtaining a driver's license. The vehicle owner information, vehicle registration information, and possibly insurance information is obtained from the vehicle owner, which is then encoded by individuals authorized by either the company or the DMV to make the cards. Some information, including the VIN #, the manufacturer code, or any national security information that is intended to be included in the card can be obtained from the vehicle manufacturer or security agents.

The present invention, due to the sensitive information provided in the card, can only be manufactured by an authorized party, including but not limited to a department of motor vehicles. While the pictures of the vehicle will be taken by the card manufacturer, the information encoded onto the card will come from the driver, much like an individual obtaining a driver's license or identification card.

Furthermore, incorporating a secret code, which can be the manufacturer code, will enable any law enforcement or security agent to obtain crucial information regarding the vehicle that the driver, particularly anyone trying to illegally obtain the car, will not know. The code can be encoded onto the card, along with the location of where the code can be physically found on the vehicle. Upon determining where the code is, law enforcement agents can look for the code, indicating whether the vehicle is in fact stolen, or in the wrong hands.

Another possible embodiment of the invention will include a photograph of the individual, in addition to the other elements of the invention. This embodiment will be particularly useful upon DMV embracement of the card, combining a driver's license with car registration, and possibly even insurance information. The photograph can be located anywhere on the card, much like the other elements, which can be rearranged as further advancements are made to the card.

Another embodiment of the present invention, in addition to the credit card sized card, is knock-off key chain strip that is capable of attaching to your key chain in order to have your card with your keys at all times. The first side of the knock-off key chain strip will have a picture of the vehicle, while the second side will have a magnetic strip. The magnetic strip will contain the same information as the larger, credit card sized card. Furthermore, the knock-off key chain strip is not limited to simply having a picture on one side and a magnetic strip on the other, and can contain any of the elements included in the credit card sized embodiment that is necessary.

In an alternative embodiment of the present invention, an instant-matic POLAROID™ camera and a plastic acrylic keychain are used to make the present invention within three to five minutes. One side of the keychain has a full color photo of the vehicle, and the second side has a close up photo of the license plate of the vehicle. The instant photos are pressed out with a die-cutter and compressed into the acrylic keychain.

In another embodiment of the present invention, a digital camera is used in conjunction with a laptop. A custom KODAK™ paper is employed to generate photo-realistic images from a color printer, and the images are then die-cut and compressed.

Ideally, insurance companies can adopt the present invention so that upon insuring a vehicle, the present invention allows both the owner and insurance company to own a permanent, physical, and compact record of the vehicle in case of claim filing.

The present invention is not limited to the embodiments described above, but encompasses all embodiments within the scope of the following claims.

What is claimed is:

1. A vehicle identification apparatus, comprising:
    a card;
    a first field on a front side of said card, having a side picture of a vehicle;

a second, third, and fourth field on a backside of said card, having a front, rear, and second side picture of the vehicle, respectively; and registration information for the vehicle on said card.

2. The vehicle identification apparatus in claim 1, wherein said registration information is encoded on a second field on said card, having a magnetic strip compatible with the nationwide motor vehicles and law enforcement data system.

3. The vehicle identification apparatus in claim 1, wherein said registration information is encoded on second field on said card, having a bar code compatible with the nationwide motor vehicles and law enforcement data system.

4. The vehicle identification apparatus in claim 1, further comprising a fourth field on said card, having a photograph of an owner of said vehicle.

5. The vehicle identification apparatus in claim, wherein said registration information is encoded on said card by an encoder program.

6. The vehicle identification apparatus in claim 1, wherein said card has at least one track of information compatible with the nationwide motor vehicles and law enforcement data system.

7. The vehicle identification apparatus in claim 1, further comprising a fifth field on said card, having information of the user's choosing.

8. The vehicle identification apparatus in claim 1, further comprising a sixth field on said card, having a company's name.

9. The vehicle identification apparatus in claim 1, further comprising insurance information for said vehicle on said card.

10. A vehicle identification apparatus, comprising:
   a card;
   a first field on a front side of said card, having a side picture of a vehicle;
   a second, third, and fourth field on a backside of said card, having a front, rear, and second side picture of the vehicle, respectively; and
   owner information for the vehicle on said card.

11. The vehicle identification apparatus of claim 10, wherein said owner information is encoded on a second field on said card, having a magnetic strip compatible with the nationwide motor vehicles and law enforcement data system.

12. The vehicle identification apparatus of claim 10, wherein said owner information is encoded on a third field of said card, having a bar code compatible with the nationwide motor vehicles and law enforcement data system.

13. The vehicle identification apparatus of claim 10, further comprising a fourth field on said card, having a photograph of an owner of said vehicle.

14. The vehicle identification apparatus of claim 10, wherein said owner information is encoded on said card by an encoder program compatible with the nationwide motor vehicles and law enforcement data system.

15. The vehicle identification apparatus of claim 10, wherein said card has at least one track of information compatible with the nationwide motor vehicles and law enforcement data system.

16. The vehicle identification apparatus in claim 10, further comprising a fifth field, having information of the user's choosing.

17. The vehicle identification apparatus of claim 10, further comprising a sixth field having a company's name on the card.

18. The vehicle identification apparatus in claim 10, further comprising insurance information for said vehicle on encoded on said card compatible with the nationwide motor vehicles and law enforcement data system.

19. A vehicle identification apparatus, comprising:
   a card;
   a first field on a front side of said card, having a side picture of a vehicle;
   a second, third, and fourth field on a backside of said card, having a front, rear, and second side picture of the vehicle, respectively;
   registration information for said vehicle on said card encoded to be compatible with the nationwide motor vehicles and law enforcement data system;
   owner information for the vehicle on said card encoded to be compatible with the nationwide motor vehicles and law enforcement data system;
   a second field on said card, having a magnetic strip, wherein said second field has at least one track of information compatible with the nationwide motor vehicles and law enforcement data system;
   a third field on said card, having a bar code, wherein said third field has at least one track of information compatible with the nationwide motor vehicles and law enforcement data system;
   a fourth field on said card, having a photograph of an owner of said vehicle;
   a fifth field on said card, having information of a user's choosing;
   a sixth field on said card, having a company's name; and
   insurance information for said vehicle on said card encoded to be compatible with the nationwide motor vehicles and law enforcement data system.

* * * * *